United States Patent [19]
Lally et al.

[11] Patent Number: 6,149,692
[45] Date of Patent: Nov. 21, 2000

[54] METHOD AND COMPOSITION FOR INCORPORATING RADIATION-ABSORBING AGENTS INTO POLYMERS

[75] Inventors: John Martin Lally, Lilburn; Deborah Jean Mulcahy, Duluth, both of Ga.; Achim Müller, Aschaffenburg, Germany; Beat Müller, Marly, Switzerland; Bernhard Seiferling, Goldbach, Germany; Friedrich Stockinger, Courtepin, Switzerland

[73] Assignee: Novartis AG, Basel, Switzerland

[21] Appl. No.: 09/141,128

[22] Filed: Aug. 27, 1998

[51] Int. Cl.⁷ ............................. D06P 5/20; D06P 3/58; G02C 7/02; G02C 7/04

[52] U.S. Cl. .................... 8/444; 8/506; 8/507; 8/543; 8/647; 351/159; 351/160 R; 351/162; 351/177

[58] Field of Search ................ 8/506, 507, 543, 8/647, 444, 497; 351/162, 160 H, 159, 160 R, 177

[56] References Cited

U.S. PATENT DOCUMENTS

| | | | |
|---|---|---|---|
| 4,157,892 | 6/1979 | Kyoichi et al. | 8/507 |
| 4,252,421 | 2/1981 | Foley | 351/162 |
| 4,468,229 | 8/1984 | Su | 8/507 |
| 4,553,975 | 11/1985 | Su | 8/507 |
| 4,559,059 | 12/1985 | Su | 9/507 |
| 4,639,105 | 1/1987 | Neefe | 351/162 |
| 4,640,805 | 2/1987 | Neefe | 264/1.1 |
| 4,680,336 | 7/1987 | Larsen et al. | 524/548 |
| 4,891,046 | 1/1990 | Wittman et al. | 8/507 |
| 4,929,250 | 5/1990 | Hung et al. | 8/507 |
| 4,929,692 | 5/1990 | Akashi et al. | 526/259 |
| 5,059,018 | 10/1991 | Kanome et al. | 351/162 |
| 5,151,106 | 9/1992 | Bhaumik et al. | 8/507 |
| 5,292,350 | 3/1994 | Molock et al. | 8/507 |
| 5,508,317 | 4/1996 | Mueller | 522/85 |

FOREIGN PATENT DOCUMENTS

| | | |
|---|---|---|
| 0396376A1 | 4/1990 | European Pat. Off. . |
| 0595575A1 | 10/1993 | European Pat. Off. . |
| 0666289A1 | 1/1994 | European Pat. Off. . |
| 0744632A1 | 5/1996 | European Pat. Off. . |
| 1400892 | 5/1973 | United Kingdom . |
| WO9409042 | 4/1994 | WIPO . |
| WO9624076 | 8/1996 | WIPO . |
| WO9805690 | 2/1998 | WIPO . |

OTHER PUBLICATIONS

CAPLUS Abstract of Batty et al, "Polymerization of Acrylonitrile in the Presence of Vinyl Sulfone Dyes," Polymer, 1975 (no month available).

*Primary Examiner*—Caroline D. Liott
*Attorney, Agent, or Firm*—R. Scott Meece; Robert J. Gorman, Jr.

[57] ABSTRACT

A method of incorporating dyes into polymeric materials. The method involved contacting a functionalized dye with a high molecular weight crosslinkable polymer precursor, dispensing the solution into a mold and applying radiation, thereby forming a molded article having dye covalently bonded to the polymer backbone. A preferred product is a visibility tinted disposable contact lens comprising poly (vinyl alcohol). Various embodiments of the innovative method offer advantages in reduced fabrication cycles, reduced extractables, elimination of post-polymerization activation steps, elimination of post-polymerization extraction steps and reduced scrap and costs associated with lens handling.

30 Claims, 3 Drawing Sheets

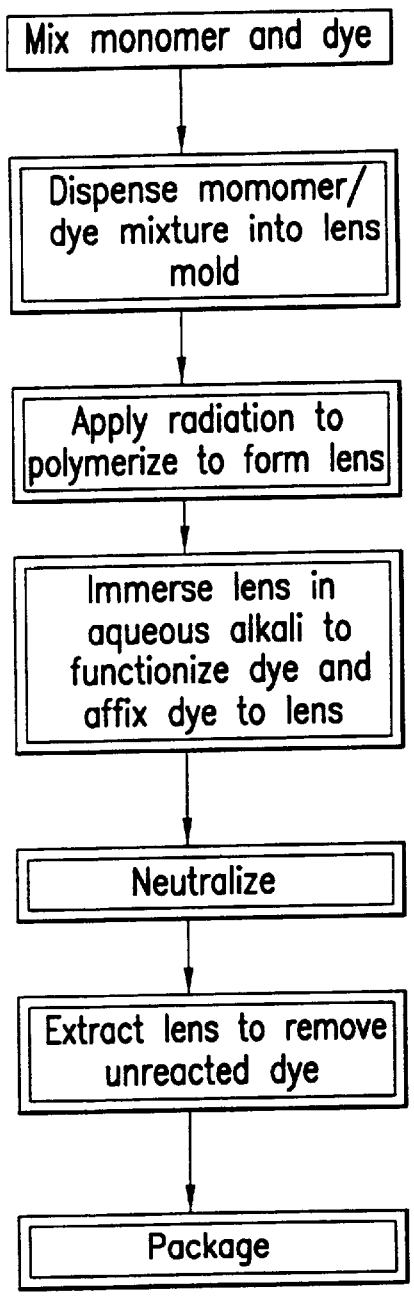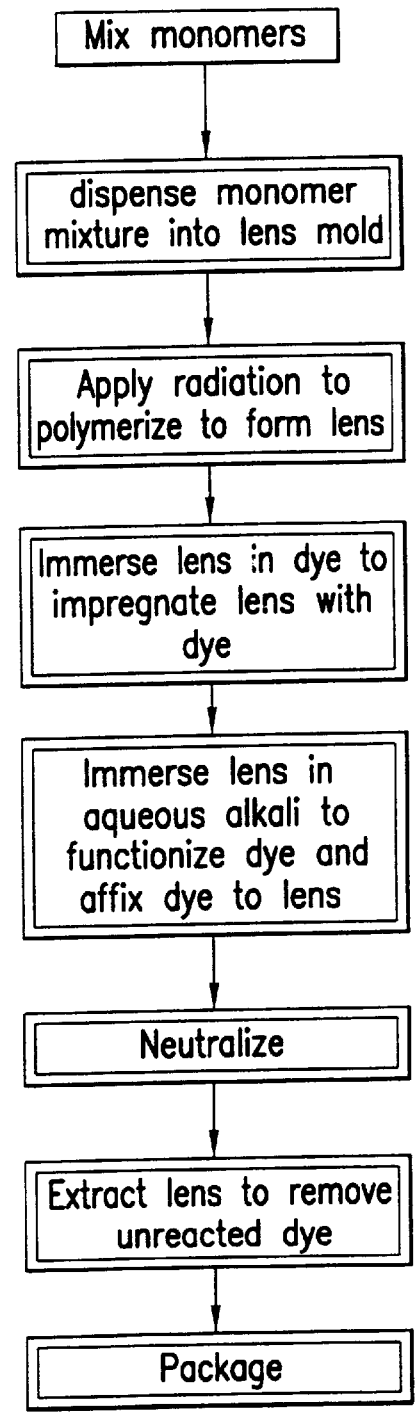
FIG. 1A
PRIOR ART
FIG. 1B
PRIOR ART

METHOD AND COMPOSITION FOR INCORPORATING RADIATION-ABSORBING AGENTS INTO POLYMERS

BACKGROUND OF THE INVENTION

1. Field of the Invention

This invention relates broadly to incorporating radiation-absorbing components into ophthalmic lenses. In a preferred embodiment, this invention relates to methods of tinting contact lenses.

2. Description of the Related Art

A number of radiation-absorbing agents have been incorporated into ophthalmic lenses, especially contact lenses, for a variety of reasons. Two popular types of radiation-absorbing agents include ultraviolet (UV) light-absorbing agents and visible light absorbing agents, i.e., tinting agents. A number of patents have issued and a number of patent applications have been published relating to this technology. Some of these patents and publications are discussed below in order to provide the reader with an understanding of the state of the art.

U.S. Pat. No. 4,157,892, issued to Tanaka, et al. on Jun. 12, 1979, teaches a method of coloring a water-absorbable plastic. The method involves forming a soft contact lens and immersing the lens in an aqueous solution of a diazonium salt at a pH suitable to cause a coupling reaction to form an azoic dye within the lens.

U.S. Pat. No. 4,553,975, issued to Kai Su on Nov. 19, 1985, and U.S. Pat. No. 4,559,059, issued to Kai Su on Dec. 17, 1985, describe polymeric lens materials in which exoskeletal covalent bonds are formed between reactive dyestuffs and monomer units of the polymer backbone. The formation of the covalent bond is effected by contacting the dyestuff formulation with the lens material under basic pH conditions. The dye is bonded to the lens material via ether linkages.

U.S. Pat. No. 4,891,046 issued to Wittman, et al. on Jan. 2, 1990, teaches a process of tinting lenses by impregnating the lens with an aqueous solution of a dichlorotriazine reactive dye and fixing the dye in the lens by immersing the lens in an aqueous alkaline solution.

U.S. Pat. No. 4,929,250, issued to Hung, et al. on May 29, 1990, discloses a method of preparing a UV-absorbing lens by contacting the lens with a solution including an agent having a reactive halotriazine bonded to an aqueous soluble moiety and a UV radiation-absorbing component.

U.S. Pat. No. 5,292,350, issued to Molock, et al. on Mar. 8, 1994, teaches a method of tinting a soft contact lens by (a) polymerizing a mixture of (i) a hydrophilic acrylate monomer and (ii) a water-soluble halotriazine dye to form a lens, then (b) immersing the lens in an aqueous alkali to react the dye with the hydroxyalkyl groups of the acrylate. The dye compound does not possess any functionality which is readily polymerizable with the hydrophilic monomer from which the lens is derived.

European Patent Application Publication No. 0 472 496 A2 teaches a method of forming a tinted lens by (a) applying an ink formulation to a lens mold, (b) allowing the ink formulation to dry, (c) adding lens forming material, (d) forming the lens, and (e) placing the lens in an activating medium.

U.S. Pat. No. 5,480,927, issued to Janssen, et al., on Jan. 2, 1996 teaches a method and composition useful in fabricating radiation-absorbing contact lenses, especially ultraviolet (Uv) and visible (tint) light-absorbing lenses. The raditation-absorber is incorporated into a contact lens in the presence of a buffer which maintains the pH near neutral. Subsequently, the radiation absorber is chemically affixed to the lens by raising the pH to a highly basic level. This process increases the amount of radiation-absorber affixed to the lens.

All of the prior disclosures teach the formation of a lens first, followed by the activation of the reaction between the lens material and the dye material. Activation is followed by extraction of unreacted dye material and activation material from the lens. There remains a need to reduce the processing time, handling, scrap, material usage and equipment required for the preparation of dyed polymeric articles, especially visibility tinted contact lenses.

SUMMARY OF THE INVENTION

An object of the invention is to provide a method of incorporating a radiation-absorbing agent into a polymeric material in an efficiency manner which minimizes in-line production steps.

Another object of the invention is to provide a method of incorporating a radiation-absorbing agent into a polymeric material which minimizes subsequent leaching or migration of the agent from the polymeric material.

A further object of the invention is to provide a method of incorporating a radiation-absorbing agent into a polymeric material in which a subsequent related activation is not required for the polymeric article.

Yet another object of the invention is to provide a method of incorporating a radiation-absorbing agent into a polymeric material in which a subsequent related extraction step is not required.

Still another object of the invention is to provide a method of incorporating a radiation-absorbing agent into a polymeric material which minimizes subsequent handling of the formed polymeric material.

These and other objects and advantages are achieved by the present invention, a summary of which follows.

One embodiment of the invention is a method of incorporating a radiation-absorbing agent or dye into a polymeric material. The method involves mixing a functionalized polymeric precursor with a functionalized dye, and irradiating the mixture, thereby reacting the dye with the polymer precursor and crosslinking and/or polymerizing the polymeric precursor to form a solid polymeric product. The dye essentially copolymerizes with the polymeric precursor. A preferred process is a continuous production process for producing visibility tinted contact lenses which does not require or include an in-line extraction step.

Another embodiment of the invention is a polymeric article which is a crosslinked or polymerized product of (a) functionalized polymeric precursors and (b) functionalized radiation-absorbing agents. A preferred polymeric product is a visibility tinted contact lens formed from a vinyl-functional poly(vinyl alcohol) and a vinyl sulfone dye.

BRIEF DESCRIPTION OF THE DRAWINGS

FIG. 1a is a schematic diagram of a commonly used prior art tinting process.

FIG. 1b is a schematic diagram of another prior art tinting process.

OUTLINE OF DESCRIPTION

A. GENERAL DESCRIPTION AND UTILITY

B. PREPOLYMER AND POLYMERIC MATERIALS

Figure 2:
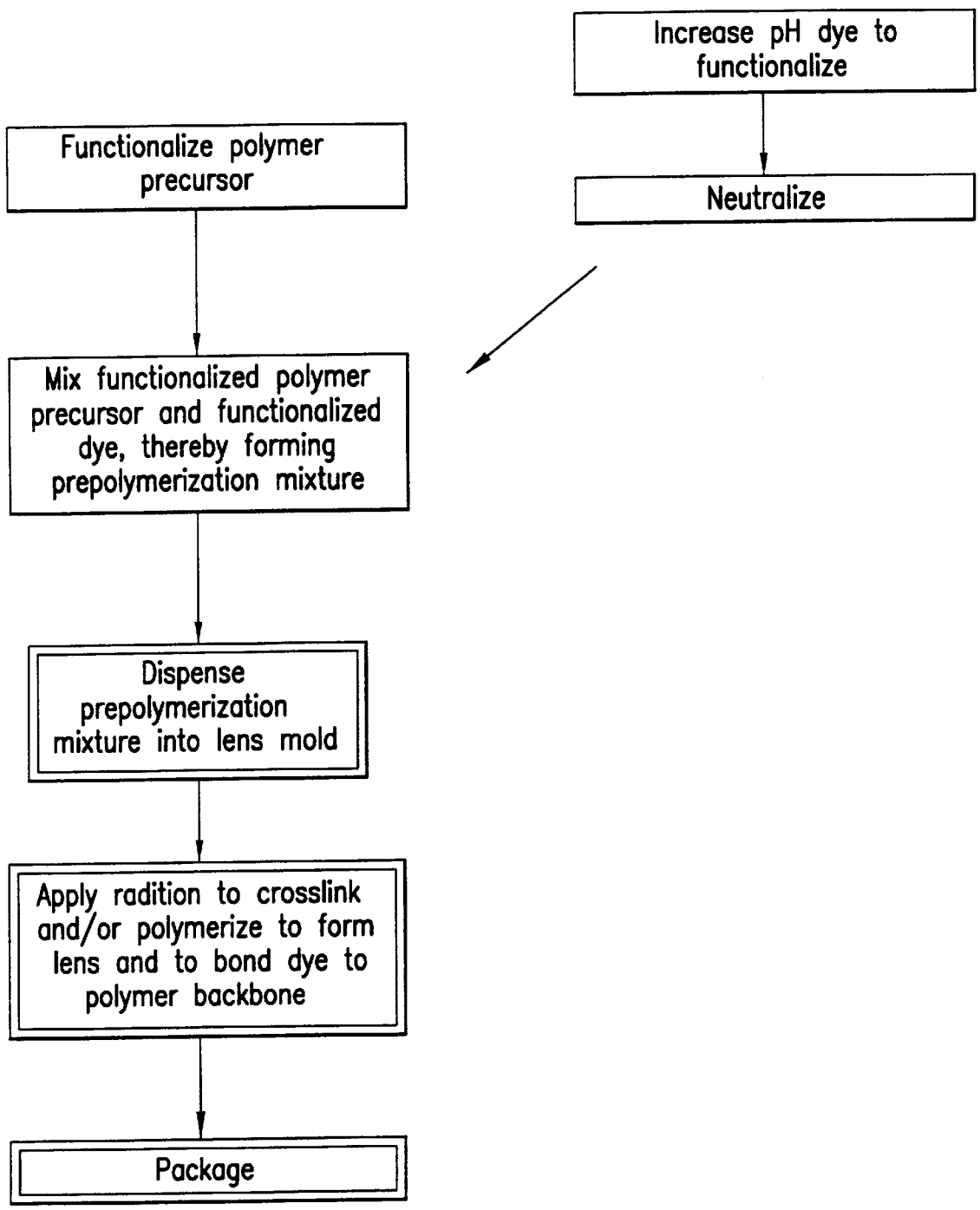
FIG. 2 is a schematic diagram of one embodiment of the present innovative tinting process.

1. PREFERRED PREPOLYMER AND POLYMER STRUCTURE
2. PURIFICATION
3. ADVANTAGES OF THE PREFERRED MATERIALS

C. PROCESS OF INCORPORATING DYES AND MOLDING LENSES

1. GENERAL DESCRIPTION
2. ADVANTAGES OF THE PROCESS
3. RADIATION-ABSORBING AGENTS
4. ACTIVATION OF RADIATION-ABSORBING AGENT
5. PREPOLYMER MOLECULAR WEIGHT
6. SOLVENTS
7. PREPOLYMER WATER SOLUBILITY
8. PHOTOINITIATORS
9. CROSSLINKING PROCESS/MOLDING
10. COMONOMERS

DESCRIPTION OF THE PREFERRED EMBODIMENTS

A. GENERAL DESCRIPTION AND UTILITY

One aspect of the present invention is a method incorporating a "radiation-absorbing agent" or dye into a polymeric article. One embodiment of the method involves the steps of preparing or providing functionalized "polymer precursor"; preparing or providing flnctionalized dye; mixing the functionalized polymer precursor with the functionalized dye, dispensing the mixture into a mold, and applying radiation to the mixture in the mold, thereby reacting and bonding the dye to the polymer precursor and crosslinking and/or polymerizing to form a solid tinted polymer article.

The terms "polymer precursor" and "prepolymer", as used herein, refer to a crosslinkable or polymerizable material. Preferably, the polymer precursor is vinyl functional, i.e., the polymer precursor includes one or more carbon—carbon double bonds.

Preferably, the polymer precursor is sufficiently large such that crosslinking of the polymer precursor produces a solid article (e.g., a contact lens) which does not require subsequent extraction steps (e.g., to achieve ophthalmic compatibility or meet regulatory requirements). Thus, the limitation on the size and/or shape of the polymer precursor is primarily a functional limitation: no or substantially no polymer precursor will leach out of the finished polymeric article.

In one preferred embodiment, the polymer precursor has a weight average molecular weight of at least about 2000. In another embodiment, the polymer precursor has a weight average molecular weight of about 10,000 to about 300,000. In yet another embodiment, the polymer precursor has a weight average molecular weight of about 50,000 to about 100,000.

While visibility tinted ophthalmic lenses are the preferred products, the present invention may have utility in the fabrication of a wide variety of translucent or transparent polymeric products, including without limitation thereto, translucent automotive windshields or side glazing; films or membranes such as membranes for diffusion control, photostructurizable films for information storage, or photoresist materials (e.g., membranes or moldings for etch resist or screen printing resist); and plastic eyeglasses or spectacles. Ophthalmic lenses, as used herein, refers to contact lenses (hard or soft), intraocular lenses, eye bandages and artificial corneas. The present invention has particular utility with regard to the fabrication of soft, hydrophilic contact lenses which are full-body tinted so that the consumer can identify the lenses in a lens-retaining container. While the invention will be discussed primarily with respect to the preferred application in contact lenses, it should be understood that certain embodiments of the invention are not so limited.

A preferred embodiment of the invention is directed to contact lenses that comprise a tinted polymer according to the invention, especially those which consist substantially or wholly of a tinted polyvinyl alcohol polymer as disclosed herein. Such contact lenses have a wide range of unusual and extremely advantageous properties, which include, for example, their excellent compatibility with the human cornea, which is based on a balanced relationship of water content, oxygen permeability, mechanical properties and dimensional stability.

The present methods of contact lens formation and tinting demonstrate remarkable improvements in process efficiency over prior art tinted lens production processes. In one respect, the present tinted lenses are particularly advantageous in that leaching of dye is essentially eliminated because the dye is chemically bonded to the polymer during the polymerization or crosslinking step. Another advantage of the invention is that the need for an extraction step subsequent to lens formation is eliminated. While many prior art processes require extraction of salts from the dye activation step, the present process does not require such extraction because pre-functionalized dye is used (i.e. . . . , activation occurs before mixing with polymer precursor). Also, in contrast to prior art processes which form ether linkages with the polymer backbone of a finished lens, the present process involves reaction of vinyl groups on a polymer precursor with vinyl groups on the dye, thereby forming carbon—carbon bonds. Thus, in the present invention, the dye is essentially copolymerized with the polymer precursor during the lens molding step, such that essentially no unreacted dye will be leachable from the lens after molding.

Therefore, in contrast to many prior art processes, the instant tinted lenses are formed without the need for steps, subsequent to polymerization or cross-linking (and in-line during the production process), of activating the dye and extracting the lens. The reduction of in-line processing steps, and/or the rearrangement of steps, offers advantages in reduced cycle time, reduced scrap associated with additional processing steps, and reduces labor, equipment and material costs related to additional processing steps.

The improved efficiency of the present invention may be more easily understood with reference to the Figures. A comparison of the FIGS. 1A and 1B prior art tinting techniques to the FIG. 2 methods of the present invention illustrates that the present invention reduces a number of in-line processing steps. With regard to the FIG. 1A process, the present invention allows for omission of the in-line alkali treatment, the in-line neutralization step and the in-line extraction step. With regard to the FIG. 1B process, the present invention allows for omission a dye immersion step in addition to elimination of the three previously-discussed steps. Moreover, not only is extraction eliminated in the in-line process, but extraction is not an essential element of the present invention at all. Thus, the present invention offers significant improvements in cycle time and improvements in processing efficiency because of a reduction in the number and complexity of steps which must be performed sequentially (i.e., "in-line") in production.

In addition to the reduced number of in-line steps, the present methods offer advantages in product consistency and process simplicity. In contrast to the present innovative methods, problems may occur if dye is mixed with polymer precursor and functionalized subseqent to this mixing by increasing the pH to a basic level. While increasing the pH functionalizes the dye, the required basic pH results in undesirable partial hydrolysis of some polymer precursors. For example, the acetate groups of some poly(vinyl alcohol) polymer precursors (PVA) will hydrolyze under basic conditions, thereby increasing the PVA viscosity. Increased viscosity impairs dispensing or pumping of the PVA. In addition, the characteristics of the final polymeric product may be altered by this undesirable partial hydrolysis of acetate groups.

Accordingly, in the present invention, a mixture of dye, which has been previously functionalized, may be mixed with the polymer precursor at near neutral pH (e.g., a pH of less than about 8). The dye may be purchased in a functionalized state. Alternatively, the dye may be subjected to basic conditions for functionalization, followed by a step of adding acid or buffer to bring the dye mixture to a near neutral pH. In either case, in the present invention a functionalized dye mixture at a non-basic pH is added to a functionalized polymer precursor, thereby avoiding any problems associated with contacting the polymer precusor with a high pH solution.

B. PREPOLYMER AND POLYMERIC MATERIALS

The polymerizable or crosslinkable materials useful in accordance with the present invention include a wide variety materials known in the art. Preferred polymeric materials are those which are biocompatible, especially ophthalmically compatible, and which are transparent. A preferred polymer precursor material is a crosslinkable poly(vinyl alcohol).

The prepolymer used in accordance with the invention includes polymerizable or crosslinkable groups, preferably crosslinkable groups. "Crosslinkable groups" denotes customary crosslinkable groups well-known to the person skilled in the art, such as, for example, photocrosslinkable or thermally crosslinkable groups. Crosslinkable groups such as those already proposed for the preparation of contact lens materials are especially suitable. Those include especially, but not exclusively, groups comprising carbon—carbon double bonds. To demonstrate the large variety of suitable crosslinkable groups, there are mentioned here, merely by way of example, the following crosslinking mechanisms: radical polymerisation, 2+2 cyclo-addition, Dieis-Alder reaction, ROMP (Ring Opening Metathesis Polymerisation), vulcanisation, cationic crosslinking and epoxy hardening.

Suitable water-soluble prepolymers that comprise crosslinkable groups are, for example, compounds comprising units of formula I (described below). It is also possible, however, to use in the process other water-soluble prepolymers that comprise a polymeric backbone and also crosslinkable groups.

The prepolymer used in accordance with the invention preferably comprises crosslinkable groups in an amount of from approximately 0.5 to approximately 80% equivalents, based on the equivalents of monomers that form the polymeric backbone, especially approximately from 1 to 50%, preferably approximately from 1 to 25%, preferably approximately from 2 to 15% and especially preferably approximately from 3 to 10%. Also especially preferred are amounts of crosslinkable groups of from approximately 0.5 to approximately 25% equivalents, especially approximately from 1 to 15% and especially preferably approximately from 2 to 12%, based on the equivalents of monomers that form the polymeric backbone.

As already mentioned, one preferred criterion for the suitability of a prepolymer for the process according to the invention is that it is a crosslinkable prepolymer, but the prepolymer is uncrosslinked, or at least substantially uncrosslinked, so that it is water-soluble.

In addition, the prepolymer is advantageously stable in the uncrosslinked state, so that it can be subjected to purification as described hereinbefore in connection with compounds comprising units of formula I. The prepolymers are preferably used in form of a pure solution in the process according to the invention. The prepolymers can be converted into the form of a pure solution for example in the manner disclosed hereinafter.

1. PREFERRED PREPOLYMER AND POLYMER STRUCTURE

A particularly preferred class of polymeric materials is poly(vinyl alcohols), especially those disclosed in U.S. Pat. No. 5,508,317, issued to inventor Beat Muller and originally assigned to Ciba-Geigy Corporation. The disclosure of U.S. Pat. No. 5,508,317 is hereby incorporated by reference. The preferred group of prepolymers of polyvinyl alcohols includes derivatives of polyvinyl alcohol having a weight-average molecular weight of at least about 2000 that, based on the number of hydroxy groups of the polyvinyl alcohol, include from about 0.5% to about 80% of units of formula I:

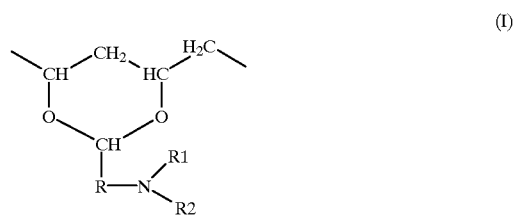

(I)

wherein:

R is lower alkylene having up to 8 carbon atoms,

R1 is hydrogen or lower alkyl, and

R2 is an olefinically unsaturated, electron-attracting copolymerizable radical, preferably having up to 25 carbon atoms, preferably an olefinically unsaturated acyl radical of the formula R3—CO—, in which R3 is an olefinically unsaturated copolymerisable radical having from 2 to 24 carbon atoms, preferably from 2 to 8 carbon atoms, especially preferably from 2 to 4 carbon atoms.

It should be noted that molecular weights, as used herein, are weight average molecular weights, Mw, unless otherwise specified.

In another embodiment, the radical R1 is a radical of the formula II:

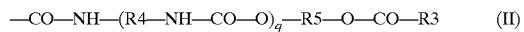

(II)

where:

q is zero or one,

R4 and R5 are each independently lower alkylene having from 2 to 8 carbon atoms, arylene having from 6 to 12 carbon atoms, a saturated divalent cycloaliphatic group having from 6 to 10 carbon atoms, arylenealkyene or alkylenearylene having from 7 to 14 carbon atoms or arylenealkyenearlyene having from 13 to 16 carbon atoms, and R3 is as defined above.

A more preferred prepolymer useful in accordance with the present invention is a derivative of a polyvinyl alcohol having a weight average molecular weight of at least about 2000 that, based on the number of hydroxyl groups of the polyvinyl alcohol, includes from about 0.5% to about 80% of units of formula III:

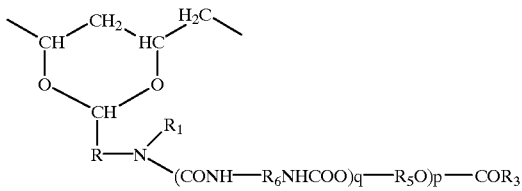

(III)

where:

R is lower alkylene, $R_1$ is hydrogen or lower alkyl, p is zero or one, q is zero or one, $R_3$ is an olefinically unsaturated copolymerisable radical having from 2 to 8 carbon atoms, and $R_4$ and $R_5$ are each, independently of the other, lower alkylene having from 2 to 8 carbon atoms, arylene having from 6 to 12 carbon atoms, a saturated divalent cycloaliphatic group having from 7 to 14 or arylenealkylenearylene having from 13 to 16 carbon atoms.

Lower alkylene R preferably has up to 8 carbon atoms and may be straight-chained or branched. Suitable examples include octylene, hexylene, pentylene, butylene, propylene, ethylene, methylene, 2-propylene, 2-butylene and 3-pentylene. Preferably lower alkylene R has up to 6 and especially preferably up to 4 carbon atoms. The meanings methylene and butylene are especially preferred.

$R_1$ is preferably hydrogen or lower alkyl having up to seven, especially up to four, carbon atoms, especially hydrogen.

Lower alkylene $R_4$ or $R_5$ preferably has from 2 to 6 carbon atoms and is especially straight-chained. Suitable examples include propylene, butylene, hexylene, dimethylethylene and, especially preferably, ethylene.

Arylene $R_4$ or $R_5$ is preferably phenylene that is unsubstituted or is substituted by lower alkyl or lower alkoxy, especially 1,3-phenylene or 1,4-phenylene or methyl-1,4-phenylene.

A saturated divalent cycloaliphatic group $R_4$ or $R_5$ is preferably cyclohexylene or cyclohexylene-lower alkylene, for example cyclohexylenemethylene, that is unsubstituted or is substituted by one or more methyl groups, such as, for example, trimethylcyclohexylenemethylene, for example the divalent isophorone radical.

The arylene unit of alkylenearylene or arylenealkylene $R_4$ or $R_5$ is preferably phenylene, unsubstituted or substituted by lower alkyl or lower alkoxy, and the alkylene unit thereof is preferably lower alkylene, such as methylene or ethylene, especially methylene. Such radicals $R_4$ or $R_5$ are therefore preferably phenylenemethylene or methylenephenylene.

Arylenealkylenearylene $R_4$ or $R_5$ is preferably phenylene-lower alkylene-phenylene having up to 4 carbon atoms in the alkylene unit, for example phenyleneethylenephenylene.

The radicals $R_4$ and $R_5$ are each, independently of the other, preferably lower alkylene having from 2 to 6 carbon atoms, phenylene, unsubstituted or substituted by lower alkyl, cyclohexylene or cyclohexylene-lower alkylene, unsubstituted or substituted by lower alkyl, phenylene-lower alkylene, lower alkylene-phenylene or phenylene-lower alkylene-phenylene.

As used herein, the term "lower", as used in connection with radicals and compounds, denotes radicals or compounds having up to 7 carbon atoms, preferably up to 4 carbon atoms, unless defined otherwise. Lower alkyl has especially up to 7 carbon atoms, preferably up to 4 carbon atoms, and is, for example, methyl, ethyl, propyl, butyl or tert-butyl. Similarly, lower alkoxy has especially up to 7 carbon atoms, preferably up to 4 carbon atoms, and is, for example, methoxy, ethoxy, propoxy, butoxy or tert-butoxy.

The olefinically unsaturated copolymerisable radical $R_3$ is preferably alkenyl having from 2 to 24 carbon atoms, especially alkenyl having from 2 to 8 carbon atoms and especially preferably alkenyl having from 2 to 4 carbon atoms, for example ethenyl, 2-propenyl, 3-propenyl, 2-butenyl, hexenyl, octenyl or dodecenyl. $R_3$ is preferably ethenyl and 2-propenyl, so that the group —CO—$R_3$ is the acyl radical of acrylic or methacrylic acid.

The divalent group —$R_4$—NH—CO—O— is present when q is one and absent when q is zero. Prepolymers in which q is zero are preferred.

The divalent group —CO—NH—($R_4$—NH—CO—O)$_q$—$R_5$—O— is present when p is one and absent when p is zero. Prepolymers in which p is zero are preferred.

In prepolymers in which, p is one the index q is preferably zero. Prepolymers in which p is one, the index q is zero and $R_5$ is lower alkylene are especially preferred.

A preferred prepolymer according to the invention is therefore especially a derivative of a polyvinyl alcohol having a molecular weight of at least about 2000 that, based on the number of hydroxy groups of the polyvinyl alcohol, comprises from approximately 0.5 to approximately 80% of units of formula III in which R is lower alkylene having up to 6 carbon atoms, p is zero and $R_3$ is alkenyl having from 2 to 8 carbon atoms.

A further preferred prepolymer according to the invention is a derivative of a polyvinyl alcohol having a molecular weight of at least about 2000 that, based on the number of hydroxy groups of the polyvinyl alcohol, comprises from approximately 0.5 to approximately 80% of units of formula III in which R is lower alkylene having up to 6 carbon atoms, p is one, q is zero, $R_5$ is lower alkylene having from 2 to 6 carbon atoms and $R_3$ is alkenyl having from 2 to 8 carbon atoms.

Yet a further preferred prepolymer according to the invention is a derivative of a polyvinyl alcohol having a molecular weight of at least about 2000 that, based on the number of hydroxy groups of the polyvinyl alcohol, comprises from approximately 0.5 to approximately 80% of units of formula III in which R is lower alkylene having up to 6 carbon atoms, p is one, q is one, $R_4$ is lower alkylene having from 2 to 6 carbon atoms, phenylene, unsubstituted or substituted by lower alkyl, cyclohexylene or cyclohexylene-lower alkylene, unsubstituted or substituted by lower alkyl, phenylene-lower alkylene, lower alkylene-phenylene or phenylene-lower alkylene-phenylene, $R_5$ is lower alkylene having from 2 to 6 carbon atoms and $R_3$ is alkenyl having from 2 to 8 carbon atoms.

The prepolymers according to the invention are preferably derivatives of polyvinyl alcohol having a molecular weight of at least about 2000 that, based on the number of hydroxy groups of the polyvinyl alcohol, comprises from approximately 0.5 to approximately 80%, especially approximately from 1 to 50%, preferably approximately from 1 to 25%, preferably approximately from 2 to 15% and especially preferably approximately from 3 to 10%, of units of formula III. Prepolymers according to the invention which are provided for the manufacture of contact lenses comprise, based on the number of hydroxy groups of the polyvinyl alcohol, especially from approximately 0.5 to approximately 25%, especially approximately from 1 to 15% and especially preferably approximately from 2 to 12%, of units of formula III.

Polyvinyl alcohols that can be derivatized in accordance with the invention preferably have a weight average molecular weight of at least 10,000. As an upper limit the polyvinyl alcohols may have a molecular weight of up to 1,000,000. Preferably, the polyvinyl alcohols have a molecular weight of up to 300,000, especially up to approximately 100,000 and especially preferably up to approximately 50,000.

Polyvinyl alcohols suitable in accordance with the invention usually have a poly(2-hydroxy)ethylene structure. The polyvinyl alcohols derivatised in accordance with the invention may, however, also comprise hydroxy groups in the form of 1,2-glycols, such as copolymer units of 1,2-dihydroxyethylene, as may be obtained, for example, by the alkaline hydrolysis of vinyl acetate/vinylene carbonate copolymers.

In addition, the polyvinyl alcohols derivatized in accordance with the invention may also comprise small proportions, for example up to 20%, preferably up to 5%, of copolymer units of ethylene, propylene, acrylamide, methacrylamide, dimethacrylarnide, hydroxyethyl methacrylate, methyl methacrylate, methyl acrylate, ethyl acrylate, vinylpyrrolidone, hydroxyethyl acrylate, allyl alcohol, styrene or similar customarily used comonomers.

Commercially available polyvinyl alcohols may be used, such as, for example, Vinol® 107 produced by Air Products (MW=22,000 to 31,000, 98–98.8% hydrolysed), Polysciences 4397 (MW=25,000, 98.5% hydrolysed), BF 14 produced by Chan Chun, Elvanol° 90–50 produced by DuPont, UF-120 produced by Unitika, Mowiol® 3–83, 4–88, 10–98 and 20–98 produced by Hoechst. Other manufacturers are, for example, Nippon Gohsei (Gohsenol®), Monsanto (Gelvatol®), Wacker (Polyviol®) and the Japanese manufacturers Kuraray, Denki and Shin-Etsu. The molecular weights referenced herein are weight average weights, Mw, determined by gel permeation chromatography, unless otherwise specified.

As already mentioned, it is also possible to use copolymers of hydrolysed vinyl acetate, which are obtainable, for example, in the form of hydrolysed ethylene/vinyl acetate (EVA), or vinyl chloride/vinyl acetate, N-vinylpyrrolidone/vinyl acetate and maleic acid anhydride/vinyl acetate.

Polyvinyl alcohol is usually prepared by hydrolysis of the corresponding homopolymeric polyvinyl acetate. In a preferred embodiment, the polyvinyl alcohol derivatised in accordance with the invention comprises less than 50% of polyvinyl acetate units, especially less than 20% of polyvinyl acetate units. Preferred amounts of residual acetate units in the polyvinyl alcohol derivatised in accordance with the invention, based on the sum of vinyl alcohol units and acetate units, are approximately from 3 to 20%, preferably approximately from 5 to 16% and especially approximately from 10 to 14%.

The compounds comprising units of formula III may be prepared in a manner known per se. For example, a polyvinyl alcohol having a molecular weight of at least about 2000 that comprises unit of formula IV

—CH(OH)—CH2— (IV)

may be reacted with approximately from 0.5 to 80%, based on the number of hydroxy groups of the compound of formula IV, of a compound of formula (V)

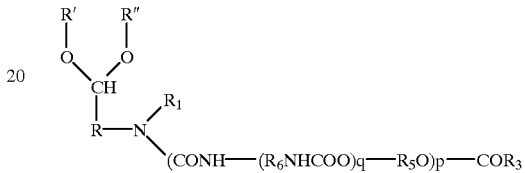

where R' and R are each, independently of the other, hydrogen, lower alkyl or lower alkanoyl, such as acetyl or propionyl, and the other variables are as defined for formula III, especially in an acidic medium.

Alternatively, a polyvinyl alcohol having a molecular weight of at least about 2000 that comprises units of formula IV may be reacted with a compound of formula VI

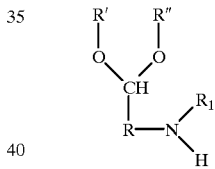

in which the variables are as defined for the compound of formula V, especially under acidic conditions, and the cyclic acetal obtainable in that manner may then be reacted with a compound of formula VII

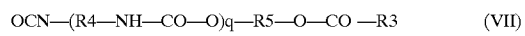

OCN—(R4—NH—CO—O)q—R5—O—CO—R3 (VII)

in which the variables are as defined for the compound of formula V.

Alternatively, the product obtainable as described above from a compound of formula IV and a compound of formula VI may be reacted with a compound of formula (VIII)

X—CO—R$_3$ (VIII)

in which $R_3$ is, for example, alkenyl having from 2 to 8 carbon atoms and X is a reactive group, for example etherified or esterified hydroxy, for example halogen, especially chlorine.

Compounds of formula V in which p is zero are known, for example, from European Pat. No. EP 201 693. Compounds of formula VI are also described therein. Compounds of formula VII are known per se, or can be prepared in a manner known per se. An example of a compound of formula VII in which q is zero is isocyanatoethyl methacrylate. An example of a compound of formula VII in which q is one is the reaction product of isophorone diisocyanate with 0.5 equivalent of hydroxyethyl methacrylate. Compounds of formula VIII are known per se; a typical representative is methacryloyl chloride. Compounds of formula V in which p and/or q are 1 can be prepared in a manner known per se from the abovementioned compounds, for example by reaction of a compound of formula VI with isocyanatoethyl methacrylate or by reaction of a compound of formula VI with isophorone diisocyanate which has previously been terminated with 0.5 equivalent of hydroxyethyl methacrylate.

Surprisingly, the prepolymers of formulae I and III are extraordinarily stable. This is unexpected for the person skilled in the art because, for example, higher-functional acrylates usually have to be stabilised. If such compounds are not stabilised then rapid polymerisation usually occurs. Spontaneous crosslinking by homopolymerisation does not occur, however, with the prepolymers of the invention.

2. PURIFICATION

The prepolymers of formulae I and III can furthermore be purified via a variety of processes. For example, the prepolymers may be purified by precipitation with organic solvents such as acetone, dialysis or ultrafiltration. Ultrafiltration is a preferred purification process. Purification of the prepolymers can produce concentrated aqueous solutions that are free, or at least substantially free, from reaction products, such as salts, and from starting materials, such as, for example, compounds of formula V or other non-polymeric constituents.

The prepolymer solutions may be subjected to repeated ultrafiltration processes, e.g., from two to about ten ultrafiltration processes. Alternatively, the ultrafiltration can be carried out continuously until the selected degree of purity is attained. A suitable measure for the degree of purity is, for example, the sodium chloride content of the solution.

The preferred solution of the prepolymer used in the process according to the invention is one that comprises no, or substantially no, undesired constituents that would have to be extracted after a crosslinking operation. Undesirable constituents includes monomeric, oligomeric or polymeric starting compounds used for the preparation of the prepolymer. Thus, the concentration of undesirable constituents after crosslinking is an amount which less than that which would cause ocular irritation or damage after normal use in the ocular environment. A particular feature of this preferred embodiment of the process according to the invention is that extraction of undesired constituents following crosslinking is not necessary.

3. ADVANTAGES OF THE PREFERRED MATERIALS

Attention may also be drawn to the fact that the contact lenses according to the invention, which means especially those comprising a radiation-absorbing polymer based on a prepolymer comprising units of formula I, can be produced in a very simple, efficient and inexpensive manner compared with the state of the art.

The preferred prepolymer materials offer a variety of advantages. First, the starting materials can be obtained or produced at a favorable cost. Second, there is the advantage that the prepolymers are surprisingly stable, so that they can be subjected to a high degree of purification. It is therefore possible to use for the crosslinking a prepolymer that requires practically no purification subsequent to crosslinking or polymerization. Also, the polymerization can be carried out in aqueous solution, so that a subsequent hydration step is not necessary. Finally, the photopolymerization occurs within a short period, so that the process for manufacturing the contact lenses has a reduced cycle time and is less costly.

All of the advantages mentioned above naturally apply not only to contact lenses but also to other moldings according to the invention. Taking into account all the various advantageous aspects in the manufacture of the moldings according to the invention it can be seen that the moldings according to the invention are especially suitable as mass-produced articles, such as, for example, contact lenses that are worn for a short time and then replaced by new lenses (e.g., daily disposable lenses).

C. PROCESS OF INCORPORATING DYES AND MOLDING LENSES

1. GENERAL DESCRIPTION

The present invention is directed to a radiation-absorbing polymer that can be obtained by contacting a functionalized dye with a functionalized polymer precursor, dispensing the resultant mixture into a mold, and then irradiating to bond the dye to the polymer precursor and to photocrosslink the polymer precursor. In a preferred embodiment, vinyl sulfone dye is mixed with an aqueous solution including functionalized poly(vinyl alcohol), the resultant solution is dispensed into a contact lens mold, and ultraviolet light is applied for a period of less than about a minute, more preferably for a period of about 1 to about 10 seconds, to form a tinted contact lens.

The contact lenses according to the invention can be molded, for example, in a manner known per se, for example in a conventional "spin-casting mold", as described, for example, in U.S. Pat. No. 3,408,429. However, double-sided molding (DSM) processes, such as described in U.S. Pat. No. 4,347,198, which is incorporated by reference, are preferred. Double-sided molding processes typically utilize a concave (also known as "female" or "front surface") mold half which mates with a convex (also known as "male" or "back surface") mold half. Typically, in the DSM process, liquid monomer or polymer precursor is dispensed into the female mold half, the male mold half is affixed to the female mold half, and light (e.g. ultraviolet) is applied to initiate polymerization or crosslinking and form a solid lens.

The liquid mixture which is dispensed into the mold is preferably an aqueous solution. For example, an approximately 15 to 40 weight percent aqueous solution can be photocrosslinked. The liquid mixture may contain additional vinylic comonomer, if so desired. However, it is preferred that, in addition to the functionalized dye, only higher molecular weight polymer precursors are used so that no subsequent extraction steps are required.

Appropriate molds or mold halves may be manufactured from disposable or recyclable polymeric materials (e.g., polypropylene or polystyrene) which transmit radiation of the chosen wavelength sufficient to crosslink or polymerize the polymer precursor. Alternatively, re-usable molds may be manufactured from materials such as quartz or sapphire.

While one embodiment of the present invention is a process of incorporating a dye into a molded polymeric article, clearly, another embodiment is a radiation-absorbing molded polymer article formed by the advantageous process. The innovative tinting process includes the following steps:

a) providing a first mixture including functionalized polymer precursor;

b) providing a second mixture including functionalized dye;

c) mixing the polymer precursor with the dye, d) introducing the resultant mixture into a mold; and e) applying radiation at an intensity and for a time sufficient to cause the dye to bond to the polymer precursor and the polymer precursor to crosslink and/or polymerize, thereby forming a solid tinted polymeric article.

A preferred embodiment of the invention is a process for the manufacture of disposable contact lenses which comprises the following steps:

a) providing an aqueous solution of functionalized poly (vinyl alcohol) having a weight-average molecular weight of at least about 2000;

b) providing an aqueous solution including about one (1) to about five (5) weight percent of a dye comprising a vinyl sulfone group;

c) mixing the dye solution with the poly(vinyl alcohol) solution at a weight ratio of about two (2) to about five (5) percent;

d) dispensing the resultant mixture into a female mold half of a double-sided contact lens molding system;

e) securing a male mold half to the female mold half; and f) applying ultraviolet radiation at an intensity of about 2.0 mW/cm$^2$ to about 4.0 mW/cm$^2$ for a period of less than about five minutes to cause the mixture to crosslink and/or polymerize, thereby forming a contact lens.

However, it should be noted that the relative ratio of the dye to the polymeric precursor may vary substantially, and is dependant, in part, upon the desired final product dimensions and desired visible and/or ultraviolet light transmission.

2. ADVANTAGES OF THE PROCESS

For convenience purposes, the advantages of the invention are described with respect to the tinting of contact lenses. However, the advantages are also applicable to a variety of embodiments involving the incorporation of radiation-absorbing additives into polymeric materials.

It should be noted at the outset that the a preferred embodiment of the present tinting process produces a full-body tinted contact lens. Thus, in contrast to some prior art techniques in which only the surface of the finished lens is tinted, the present lenses are tinted uniformly throughout the entire thickness of the lens. The complete and uniform tinting of the lens material allows the consumer to easily view and grasp the lens which is immersed in a transparent liquid in a contact lens container.

The process disclosed herein offers numerous advantages over known contact lens tinting processes. This innovative tinting process offers advantages in (1) process speed, simplicity and efficiency, (2) elimination of post-molding tint activation steps, (3) elimination of post-molding extraction steps, (4) improved product consistency and (5) good viscosity/flowability of polymer precursor. These advantages translate into reductions in manufacturing manpower, cycle time, material costs and scrap, and/or equipment costs, in addition to the production of a high quality product.

In prior art techniques, tint was typically applied to the molded lens subsequent to polymerization. After contacting the lens with the tinting additive, the tint was chemically bonded to the polymer backbone in an activation step, typically requiring immersion of the lens in a high pH solution. Subsequently, the lens was extracted to remove unreacted dye. Some processing time was required to properly soak the lens in the tinting additive and/or basic activation solution for uniform tinting, because the lens was a solid material which inhibited uniform dispersion.

In contrast, the present method involves the mixing of dye with the polymer precursor while the polymer precursor is still in a solution state, thereby enabling uniform dye dispersion throughout the lens by simple mixing of the liquid polymer precursor/dye solution. In addition, functionalizing of the dye is accomplished before dispensing solution into the lens mold (i.e., before the in-line production process), thereby eliminating the need to extract the final lens product to remove activating agents or by-products (e.g., salts). Any purification of the polymer precursor and dye solution is accomplished prior to the in-line production process, thereby reducing cycle time. Thus, tinted prepolymer solutions may be prepared in parallel with the molding process, as opposed to the prior art process which required tinting in series with the molding process. This parallel tinting/molding approach, along with the elimination of the extraction step, reduces cycle time, thereby increasing production rates.

Furthermore, the present process can improve product consistency, thereby reducing scrap and increasing quality. The improved consistency is attributed, in part, to the thorough mixing of a solution of the polymer precursor and dye (with both being in a functionalized state), in contrast to the prior art application of dye solution on the solid lens followed by application of an activating solution to functionalize the dye.

In addition, groups (e.g. acetate) on the chosen polymer precursor (e.g., the above-cited polyvinyl alcohols) which are subject to reaction under basic conditions are not harmed by the present process. Neither the polymer precursor nor the finished lens need be subjected to high pH conditions in the present process. Activation of the dye, via increased pH, is accomplished before the dye contacts the polymer precursor. Alternatively, the activated dye may be purchased directly from a manufacturer and mixed with the polymer precursor. Accordingly, the present process avoids problems with final product properties and polymer precursor viscosity which are adversely affected by increased pH. Preferably, the polymer precursor, alone or in combination with the dye, does not experience a pH above about 8 during the process.

Finally, reaction or copolymerization of the preferred vinyl-functional dyes with the preferred vinyl-functional polymer precursors results in a carbon—carbon bond between the dye and polymer. This bond exhibits high chemical stability, and substantially higher stability than the ether linkages which are representative of some prior art teachings. Accordingly, the present process products a robust, chemically stable full-body tinted contact lens.

3. RADIATION-ABSORBING ADDITIVES/DYES

Preferred groups of dyes for ophthalmic lens applications are those which absorb ultraviolet (UV) light and those which absorb visible light (i.e., dyes or tinting agents). While the invention may be described in certain passages herein with respect to a dye or tinting agent for convenience, the present invention is not limited to a particular dye or group of radiation-absorbing agents. However, the dye must be vinyl-functional, or must be able to be converted into a vinyl-functional form. Thus, the invention has utility in incorporating a wide variety of vinyl-functional dyes into polymeric materials. Accordingly, the dyes described below are only exemplary and do not limit the scope of the present invention.

Reactive dyes containing vinyl sulfone precursors are preferred. Vinyl sulfone dyes include, without limitation thereto, β-sulfatoethylsulfonyl, β-sulfatoethylsulfonamido, β-hydroxyethylsulfonyl and β-hydroxyethylsulfonamido substituents, as well as suitable derivatives thereof.

Some examples of commercially available dyes suitable for use according to the invention include REMAZOL (Hoechst). Some preferred dyes include REMAZOL Yellow GR (Reactive Yellow 15, Registry Number CAS 60958-41-0); REMAZOL Turquoise P or RP (Reactive Blue 21, Registry Number CAS 73049-92-0) REMAZOL Black B (Reactive Black 5, Registry number CAS 17095-24-8); REMAZOL Golden Orange 3GA (Reactive Orange 78, Registry Number CAS 68189-39-9); and Rhodazol Brilliant Blue RW. A particularly preferred reactive dye is REMAZOL Reactive Blue 19 (Registry number CAS 2580-78-1) (1-amino-9,10-dihydro-9,10-dioxo-4((3-((2-(sulfooxy) ethyl)sulfonyl) phenyl)-amino)-2-anthracenesulfonic acid, disodium salt).

A particularly preferred functionalized dye is an vinyl sulfone REMAZOL Blue 19. A vinyl sulfone Blue 19 dye, UNIBLUE A, is available commercially from Aldrich.

The amount of dye necessary in a particular application depends on a number of factors. Clearly, if excessive activated dye is used, the dye could conceivably bond to the majority or substantially all of the reactive sites on the polymer precursor. Thus, excessive dye could reduce the crosslinkable groups and thereby diminish the mechanical properties of the final polymer product. Accordingly, a theoretical upper limit on dye concentration is that which will cause undesirable harm to the physical properties of the final polymer product. However, only a relatively small concentration of dye is required to produce a visibility tint contact lens, so this upper limit is typically not a constraint. Generally, the weight percentage of dye, based on the total dehydrated contact lens weight, is about 0.00001% to about 0.01%. Preferably, the weight percentage of dye is about 0.0001% to about 0.001%. More preferably, the weight percentage of dye is about 0.0001% to about 0.0005%.

4. ACTIVATION OF THE DYE

While it is possible to purchase dyes in free form, typically dyes are commercially available as addition compounds. The REMAZOL dyes, which are preferred dyes, are typically commercially available as the β-sulphatoethylsulphone derivative. Under mild alkaline conditions, a bisulphate anion is released, yielding a free vinyl sulfone form of the dye which can be reacted with functionalized polymer precursors (See FIG. 3). This step of converting the dye to a vinyl sulfone form is referred to as an activation or a functionalization step.

Therefore, prior to addition of a dye to the polymer precursor solution, and optional thorough mixing, activation of the dye is required in order to be able to subsequently covalently bond the dye to the polymer precursor. Activation is preferably accomplished by increasing the pH of the solution to a basic level for a time sufficient to convert substantially all of the dye to a vinyl-functional form. The pH may be raised to about 10 to about 14, preferably about 12 to about 14, more preferably about 12.5 to about 13.5 for a period of about 1 to about 30 minutes, preferably about 10 to about 20 minutes. Temperatures during the activation process are held at about 25 to 75° C., preferably about 30 to 50° C.

The pH may be increased by addition of a variety of basic activator compounds, including without limitation thereto, sodium hydroxide, sodium bicarbonate, potassium bicarbonate, sodium phosphate, potassium phosphate, tribasic sodium phosphate dodecahydrate, mixtures thereof, and the like. A preferred aqueous basic activator solution includes about 5 to about 15, preferably about 8 to about 12, weight percent tribasic sodium phosphate dodecahydrate, about 1 to about 5, preferably about 1 to 3, weight percent tetrabutyl ammonium bromide.

Prior to contacting the activated dye with the polymer precursor, the dye solution is neutralized. The dye solution may be neutralized by any of a number of means known in the art. Preferably an acid solution (e.g., 2N HCl) is added in sufficient quantity to reduce the pH below about 8, more preferably below about 7.4, and even more preferably to about 7.

Subsequent to dye activation, the dye solution itself may be purified to remove undesirable components, such as salts from the pH altering step or raw material impurities. However, this purification step is optional.

5. POLYMER PRECURSOR MOLECULAR WEIGHT

In a preferred embodiment, the polymer precursor has a weight average molecular weight of at least about 2000. More preferably, the polymer precursor has a weight average molecular weight of from approximately 10,000 to approximately 300,000. A more preferred weight average molecular weight of the polymer precursor mixtures is about 10,000 to about 200,000. Even more preferred is a weight average molecular weight of about 50,000 to about 100,000. Additional discussion regarding preparation of polymer precursor may be found in U.S. Pat. No. 5,508,317, issued to Beat Müller on Apr. 16, 1996, which is hereby incorporated by reference.

The size of the polymer precursor, described here in terms of weight average molecular weight, is important for at least two reasons. The first reason relates to the speed of product formation. The process of crosslinking polymer precursor having relatively large molecular weights is much faster than polymerization of monomers. This increased speed of formation of the final article, e.g. contact lens, translates into an increased production rate and lower costs per product unit. These advantages are explored more fully in U.S. Pat. No. 5,508,317.

The second reason for forming a relatively large polymer precursor, as opposed to polymerization of monomers, relates to the elimination of post-molding extraction steps. In contrast to prior art techniques which suggest reacting the dye to the polymer backbone of the finished article, the present method includes a step of adding functionalized dye to a relatively high molecular weight polymer precursor before forming the shaped article, i.e., before crosslinking. The resultant polymer precursor/dye solution is then subjected to radiation to crosslink the polymer precursor and bond the dye to the polymer. Thus, the dye is covalently bonded to the polymer precursor, and the purified, dyed high molecular weight polymer precursor is crosslinked, so that there is not a substantial amount of low molecular weight extractables remaining in the molded product.

6. SOLVENTS

As noted earlier, preferred polymer articles are formed by cross-linking water-soluble polymer precursors, with dye covalently attached thereto, in a liquid form. Preferably, the polymer precursors are in solution with a solvent. More preferably, the solution is an aqueous solution. The moldings produced by crosslinking are water-insoluble but are swellable in water.

Suitable solvents for the preferred polyvinyl alcohol polymer precursor include water, alcohols, such as lower alkanols, for example ethanol or methanol, also carboxylic acid amides, such as dimethylformamide, or dimethyl sulfoxide, and also a mixture of suitable solvents, such as, for example, a mixture of water with an alcohol, such as, for example, a water/ethanol or a water/methanol mixture. The substantially aqueous solution is more preferably a pure aqueous solution or a solution in an artificial lacrimal fluid.

7. POLYMER PRECURSOR WATER SOLUBILITY

In accordance with a preferred embodiment of the invention, the criterion that the polymer precursor is soluble in water denotes in particular that the polymer precursor is soluble in a concentration of approximately from 3 to 90% by weight, preferably approximately from 5 to 60% by weight, especially approximately from 10 to 60% by weight, in a substantially aqueous solution. Insofar as it is possible in an individual case, polymer precursor concentrations of more than 90% are also included in accordance with the invention. Especially preferred concentrations of the polymer precursor in solution are from approximately 15 to approximately 50% by weight, especially from approximately 15 to approximately 40% by weight, for example from approximately 25% to approximately 40% by weight.

The aqueous solution of polymer precursor may be a salt solution, especially solutions that have an osmolarity of approximately from 200 to 450 milliosmol per 1000 ml (unit: mOsm/l), preferably an osmolarity of approximately from 250 to 350 mOsm/l, especially approximately 300 mOsm/l, or in mixtures of water or aqueous salt solutions with physiologically tolerable polar organic solvents, such as, for example, glycerol.

The aqueous salt solutions are advantageously solutions of physiologically tolerable salts, such as buffer salts customary in the field of contact lens care, for example phosphate salts, or isotonising agents customary in the field of contact lens care, such as, especially, alkali halides, for example sodium chloride, or solutions of mixtures thereof. An example of an especially suitable salt solution is an artificial, preferably buffered, lacrimal fluid that in respect of pH value and osmolarity is adapted to natural lacrimal fluid, for example a sodium chloride solution that is unbuffered or that is preferably buffered, for example, by phosphate buffer, and that has an osmolarity that corresponds to the osmolarity of human lacrimal fluid.

The substantially aqueous solution of the polymer precursor defined above is preferably a pure solution which means a solution which is free or essentially free from undesired constituents. The viscosity of the solution of the prepolymer in the substantially aqueous solution should be sufficiently low to allow reasonable processability. Thus, the polymer precursor solution viscosity should be sufficiently low to allow dispensing through the chosen dispensing tip into the female mold half at a reasonably fast rate in order to minimize cycle time and in order to minimize product defects (e.g., defects associated with bubble formation).

8. PHOTOINITIATORS

In the case of photocrosslinking, it is appropriate to add a crosslinking initiator (preferably a photoinitiator for photocrosslinking) which can initiate crosslinking. The photoinitiator is preferably added to the dyed and purified polymer precursor solution. A reasonable amount of mixing is preferred to distribute the photoinitiator substantially uniformly throughout the polymer precursor solution. Photoinitiators are known to the person having ordinary skill in the art, and include, without limitation thereto, benzoin methyl ether, 1-hydroxycyclohexylphenyl ketone, and DAROCUR® or IRGACUR types, e.g. DAROCUR® 1173 or IRGACUR 2959, available from Ciba-Geigy Corporation (Ardsley, N.Y.). The crosslinking can then be triggered by actinic radiation, such as, for example, UV light, or ionising radiation, such as, for example, gamma radiation or X-radiation.

9. CROSSLINKING INITIATION/MOLDING

Crosslinking may be accomplished by applying radiation to the polymer precursor mixture. Suitable forms of radiant energy which may trigger crosslinking, under appropriate conditions, include ultraviolet (UV) light, gamma radiation and X-ray radiation. Alternatively, or simultaneously with application of light, heat may be added to trigger the crosslinking. Preferably, the step of crosslinking consists of applying radiation at an intensity and for a time sufficient to cause crosslinking and form a solid polymeric article. The step of crosslinking occurs in the minimal amount of time possible to form a solid polymeric article. In the case of ophthalmic lenses, the step of crosslinking preferably occurs in a period of about 5 seconds to about 30 minutes, more preferably about 5 seconds to about 5 minutes, even more preferably about 5 seconds to about one minute, and most preferably about 5 seconds to about 30 seconds.

Figure 3:
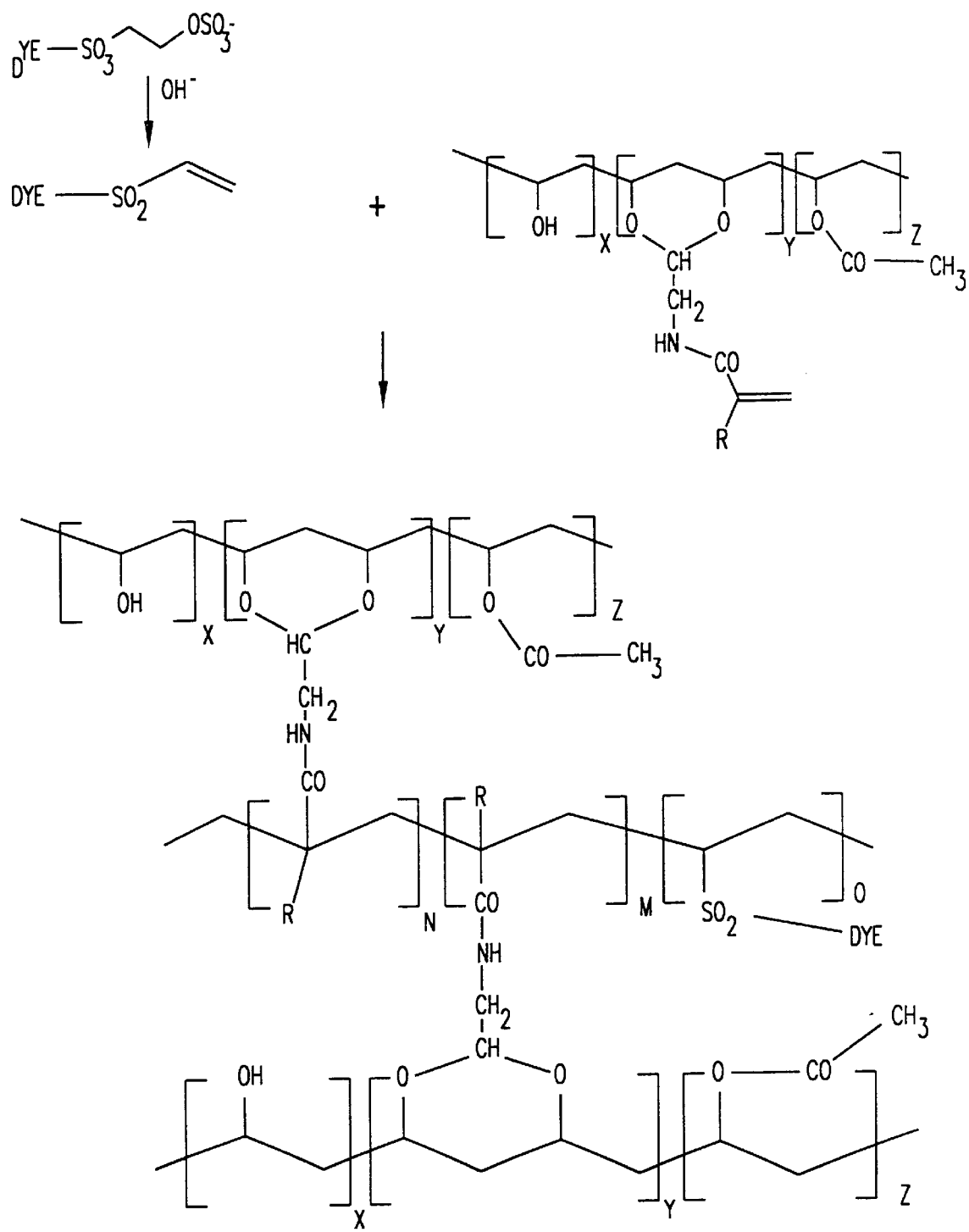
FIG. 3 is an illustration of exemplary chemical structures involved in one exemplary embodiment of the present invention.

FIG. 3 illustrates crosslinking of an exemplary dye-containing functionalized poly(vinyl alcohol) (PVA) by application of ultraviolet light. The vinyl functional pendant groups remaining on the PVA after covalent bonding with the functional dye react with other vinyl functional pendant groups on the PVA. While FIG. 3 is presented to enhance the reader's understanding of the chemistry involved in the process, it will be understood that the specific location of reactive pendant groups on the PVA may vary widely, and the FIG. 3 embodiment does not impose any limits the scope of the invention.

10. COMONOMERS

It is preferable to carry out the crosslinking process according to the invention without the addition of a comonomer, for example a vinylic comonomer. However, a vinylic comonomer may be used in addition in the photocrosslinking, and the comonomer may be hydrophilic or hydrophobic or a mixture of a hydrophobic and a hydrophilic vinylic monomer. Suitable vinylic monomers include especially those customarily used in the manufacture of contact lenses. A hydrophilic vinylic monomer denotes a monomer that typically yields as homopolymer a polymer that is water-soluble or can absorb at least 10% by weight of water. Analogously, a hydrophobic vinylic monomer denote, a monomer that typically yields as homopolymer a polymer that is water-insoluble and can absorb less than 10% by weight of water.

Generally, approximately from 0.01 to 80 units of a typical vinylic comonomer react per unit of formula I or III. If a vinylic comonomer is used, the crosslinked polymers according to the invention preferably comprise approximately from 1 to 15%, especially preferably approximately from 3 to 8%, of units of formula I or III, based on the number of hydroxy groups of the polyvinyl alcohol, which are reacted with approximately from 0.1 to 80 units of the vinylic monomer.

The proportion of the vinylic comonomers, if used, is preferably from 0.5 to 80 units per unit of formula I, especially from 1 to 30 units per unit of formula I, and especially preferably from 5 to 20 units per unit of formula I.

It is also preferable to use a hydrophobic vinylic comonomer or a mixture of a hydrophobic vinylic comonomer with a hydrophilic vinylic comonomer, the mixture comprising at least 50% by weight of a hydrophobic vinylic comonomer. In that manner the mechanical properties of the polymer can be improved without the water content falling substantially. In principle, however, both conventional hydrophobic vinylic comonomers and conventional hydrophilic vinylic comonomers are suitable for the copolymerisation with polyvinyl alcohol comprising groups of formula I.

Suitable hydrophobic vinylic comonomers include, without the list being exhaustive, $C_1$–$C_{18}$ alkyl acrylates and methacrylates, $C_3$–$C_{18}$ alkyl acrylamides and methacrylamides, acrylonitrile, methacrylonitrile, vinyl-$C_1$–$C_{18}$ alkanoates, $C_2$–$C_{18}$ alkenes, $C_2$–$C_{18}$ haloalkenes, styrene, $C_1$–$C_6$ alkylstyrene, vinyl alkyl ethers, in which the alkyl moiety contains from 1 to 6 carbon atoms, $C_2$–$C_{10}$ perfluoroalkyl acrylates and methacrylates or correspondingly partially fluorinated acrylates and methacrylates, $C_3$–$C_{12}$ perfluoroalkyl-ethylthiocarbonylaminoethyl acrylates and methacrylates, acryloxy- and methacryloxy-alkylsiloxanes, N-vinylcarbazole, $C_1$–$C_{12}$ alkyl esters of maleic acid, fumaric acid, itaconic acid, mesaconic acid and the like. $C_1$–$C_4$ alkyl esters of vinylically unsaturated carboxylic acids having from 3 to 5 carbon atoms or vinyl esters of carboxylic acids having up to 5 carbon atoms, for example, are preferred.

Examples of suitable hydrophobic vinylic comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluoro-hexylethylthiocarbonylaminoethyl methacrylate, isobornyl methacrylate, trifluoroethyl methacrylate, hexafluoroisopropyl methacrylate, hexafluorobutyl methacrylate, tris-trimethylsilyloxy-silyl-propyl methacrylate, 3-methacryloxypropylpentamethyldisiloxane and bis (methacryloxypropyl)tetramethyldisiloxane. Preferred hydrophobic vinylic comonomers are methyl methacrylate and vinyl acetate.

Suitable hydrophilic vinylic comonomers include, without the limitation thereto, hydroxy-substituted lower alkyl acrylates and methacrylates, acrylamide, methacrylamide, lower alkyl acrylamides and methacrylamides, ethoxylated acrylates and methacrylates, hydroxy-substituted lower alkyl acrylamides and methacrylamides, hydroxy-substituted lower alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- or 4-vinylpyridine, acrylic acid, methacrylic acid, amino- (the term "amino" also including quaternary ammonium), mono-lower alkylamino- or di-lower alkylamino-lower alkyl acrylates and methacrylates, allyl alcohol and the like. Hydroxy-substituted C2–C4alkyl(meth)acrylates, five- to seven-membered N-vinyl lactams, N,N-di-C1–C4alkyl(meth)acrylamides and vinylically unsaturated carboxylic acids having a total of from 3 to 5 carbon atoms, for example, are preferred.

Examples of suitable hydrophilic vinylic comonomers include hydroxyethyl methacrylate, hydroxyethyl acrylate, acrylamide, methacrylamide, dimethylacrylamide, allyl alcohol, vinylpyridine, vinylpyrrolidone, glycerol methacrylate, N-(1,1-dimethyl-3-oxobutyl)acrylamide, and the like. Preferred hydrophilic vinylic comonomers are 2-hydroxyethyl methacrylate, N-vinylpyrrolidone and acrylamide.

The previous disclosure will enable one having ordinary skill in the art to practice the invention. In order to better enable the reader to understand specific embodiments and the advantages thereof, reference to the following examples is suggested.

EXAMPLE 1

Functionalization of Dye

An aqueous dye solution is prepared by diluting 5 ml of purified liquid REMAZOL Blue 19 dye in 200 ml of water. Sodium carbonate solution (10%) is added dropwise until the dye solution has a pH of about 10.5. The resulting solution is maintained at a pH of less than about 10.0 for about 45 minutes (adding additional sodium carbonate if necessary). The pH of the solution is adjusted to neutral by dropwise addition of IN HCI.

EXAMPLE 2

Preparation of Polymer Precursor Functionalizer 220 grams of sodium hydroxide is dissolved in 300 grams water and 700 grams ice in a 3-liter reactor having a stirrer and cooling system. The sodium hydroxide solution is cooled to 10° C. 526grams of aminoacetaldehyde dimethylacetal and 50 mg of 4-hydroxy-2,2,6,6-tetramethylpiperidin-1-oxide (a radical inhibitor) are added to the sodium hydroxide solution.548.6 grams of methacrylic acid chloride are slowly added to the solution at 10° C. over a period of 3.5 hours. The pH value drops slowly to 7.2 when the addition is complete, and amine can no longer be detected by gas chromatography. The mixture is extracted with 500 ml of petroleum ether, and in order to remove impurities, the aqueous phase is saturated with sodium chloride and extracted three times with 500 ml of tert-butyl methyl ether. The organic phase is dried with magnesium sulfate, filtered and concentrated using a rotary evaporator. The resulting 882.2 g. of yellowish oil are slowly stirred into 2000 ml of petroleum ether at −10° C. by means of an Ultraurax. The product crystallizes, and is isolated by filtration and dried. 713.8 grams of methacrylamidoacetaldehyde dimethylacetal, having a melting point of 30–32° C. are obtained. The product is 99.7% pure according to gas chromatography.

EXAMPLE 3

Preparation of Crosslinkable Polymer Precursor 300 grams of Mowiol 3–83 (from Hoechst) are placed in a 2-liter double-jacket reactor having a strirrer and thermometer. 800 grams of deionized water are added to the reactor, and the aqueous mixture is heated to 95° C. with stirring. After about an hour, a clear solution of PVA is produced. The solution is cooled to 20° C.

27 g. of methacrylamidoacetaldehyde dimethyl acetal functionalizer (from Example 2), 440 g. of acetic acid, 100 g. of concentrated hydrochloric acid (37%) and 333 g. of deionized water are mixed to produce a 2000 g. reaction solution. The mixture is stirred for 20 hours at 20° C. to produce a crosslinkable poly(vinyl alcohol). The change in acetate content can be ascertained by titration with acetic acid.

EXAMPLE 4

Purification of Crosslinkable Polymer Precursor

The crosslinkable PVA solution from Example 3 is dialysed by means of ultrafiltration. The ultrafiltration is accomplished by using a 1-KD-Omega membrane produced by Filtron. Ultrafiltration is continued until a residue sodium chloride content of 0.004% is achieved. Concentration of the dialysed solution yields 747 grams of a 30.0% crosslinable PVA solution with N-content of 0.672% (by Kjendahl determination), acetate content of 1.516 meg/g. (by hydrolysis), dynamic viscosity of 2000 mPas, double bonds of 0.480 meq/g. (by microhydrogenation), free hydroxyl groups of 17.74 meq/g (by reacetylation), molecular weights of Mw=26200 and Mn=12300 (by size exclusion chromatography in water).

EXAMPLE 5

Preparation of Tinted Crosslinkable Polymer Formulation

About one gram of the functionalized dye solution from Example 1 is added to about 50 grams of the purified crosslinkable poly(vinyl alcohol) from Example 4 which has been cooled to about 25° C. About 0.015 grams of IRGA-CURE 2959 is added to the solution. The resultant formulation is mixed for about one hour at 60° C.

EXAMPLE 6

Formation of Tinted Contact Lens

About 0.25 ml of the tinted crosslinkable polymer formulation from Example 5 is dispensed into a female mold half of a double-sided contact lens mold. The male mold half is then releasably affixed to the female mold half. Ultraviolet radiation is applied at an intensity of about 2.5 mW/cm$^2$ for a period of about 14 seconds. The mold halves are separated and the lens is removed. The lens is uniformly tinted throughout the body and has a visible light transmission of about 96%.

The invention has been described in detail, with reference to certain preferred embodiments, in order to enable the reader to practice the invention without undue experimentation. However, a person having ordinary skill in the art will readily recognize that many of the components and parameters may be varied or modified to a certain extent without departing from the scope and spirit of the invention. Furthermore, titles, headings, or the like are provided to enhance the reader's comprehension of this document, and should not be read as limiting the scope of the present invention. Accordingly, the intellectual property rights to this invention are defined only by the following claims and reasonable extensions and equivalents thereof.

That which is claimed is:

1. A method of forming a radiation-absorbing polymeric article, comprising the steps of:
    a) providing a vinyl-functionalized polymer precursor having an average molecular weight of at least about 2000; and comprising polymerizable or crosslinkable groups;
    b) providing a vinyl-functionalized dye having at least one polymerizable or crosslinkable group capable of reacting with the polymerizable or crosslinkable groups on the polymer precursor;
    c) mixing the functionalized polymer precursor with the functionalized dye to form a prepolymerization mixture;
    d) dispensing the prepolymerization mixture into a mold; and
    e) applying radiation to the prepolymerization mixture in the mold, thereby bonding the dye to the polymer precursor through a saturated carbon—carbon bond; and crosslinking and/or polymerizing the polymer precursor to form a radiation-absorbing polymeric article.

2. A method of claim 1, wherein the dye is selected from the group consisting of ultraviolet light-absorbing dyes and visible light-absorbing dyes.

3. A method of claim 2, wherein the dye is a vinyl sulfone dye.

4. A method of claim 3, wherein the vinyl sulfone dye is 1-amino-9,10-dihydro-9,10-dioxo-4((3-((2-(sulfooxy)ethyl) sulfonyl) phenyl)-amino)-2-anthracenesulfonic acid, disodium salt.

5. A method of claim 1, wherein the polymeric article is an ophthalmic lens.

6. A method of claim 5, wherein the ophthalmic lens is a contact lens.

7. A method of claim 1, wherein the polymeric article comprises a hydrophilic polymer.

8. A method of claim 7, wherein the polymeric article comprises poly(vinyl alcohol).

9. A method of claim 1, wherein the polymeric precursor has a weight average molecular weight of about 10,000 to about 300,000.

10. A method of claim 9, wherein the polymeric precursor has a weight average molecular weight of about 50,000 to about 100,000.

11. A method of claim 1, wherein the step of providing a functionalized dye comprises the steps of:
    a) adding a base to an aqueous solution including a dye to produce an elevated pH, thereby generating functional groups on the dye; and
    b) reducing the pH of the solution to below about 8 before contacting the dye with the polymer precursor.

12. A method of claim 11, wherein the elevated pH is about 10 to about 14.

13. A method of claim 1, wherein the weight percentage of dye, based on total dehydrated polymer article weight, is about 0.0001 to about 0.001 percent.

14. A method of claim 1, wherein the crosslinking occurs in a period of less than about a minute.

15. A method of forming a polymer article of claim 1, wherein the article is formed in the complete absence of post-molding extraction processes.

16. A method of claim 1, wherein radiation is applied for a period greater than 0 minutes, and less than about 5 minutes.

17. A method of claim 16, wherein said radiation is ultraviolet radiation and is applied for a period greater than 0 minutes, and less than about 5 minutes, and wherein said polymeric article is a contact lens.

18. A method of forming a tinted contact lens, comprising the steps of:
    a) providing a first aqueous solution of a functionalized poly(vinyl alcohol), wherein the poly(vinyl alcohol) has a weight average molecular weight of at least about 2000;
    b) adding a functionalized vinyl sulfone dye to the functionalized poly(vinyl alcohol) solution to form a mixture;

c) providing a double-sided contact lens mold comprising a male mold half and a female mold half; and introducing the mixture into the female mold half of the double-sided contact lens mold;

d) removably affixing the male contact lens mold half to the female contact lens mold half, thereby defining a lens-forming cavity; and e) applying ultraviolet radiation to polymerize and/or crosslink the poly(vinyl alcohol) and to react the vinyl sulfone dye with the poly(vinyl alcohol) to form a carbon—carbon bond therebetween, thereby forming a tinted contact lens.

19. A method of forming a contact lens of claim 18, wherein the lens is formed in the complete absence of post-molding extraction processes.

20. A radiation-absorbing polymeric article which is formed by a process comprising the steps of:

a) contacting a vinvl-functionalized polymer precursor comprising polymerizable or crosslinkable groups and having an average molecular weight of at least about 2000 with a vinyl-functionalized dye comprising at least one polymerizable or crosslinkable group capable of reacting with the polymerizable or crosslinkable groups on the polymer precursor, thereby forming a prepolymerization mixture;

b) dispensing said prepolymerization mixture into a mold; and c) applying radiation to the prepolymerization mixture in the mold, thereby bonding the dye to the polymer precursor through a saturated carbon—carbon bond, and crosslinking and polymerizing the polymer precursor and the dye to form a radiation-absorbing polymeric article.

21. An article of claim 20, wherein the article is an ophthalmic lens.

22. An article of claim 21, wherein the ophthalmic lens is a contact lens.

23. An article of claim 20, wherein the polymeric precursor has a weight average molecular weight of about 10,000 to about 300,000.

24. An article of claim 23, wherein the polymeric precursor has a weight average molecular weight of about 50,000 to about 100,000.

25. An article of claim 20, wherein the polymeric article comprises poly(vinyl alcohol).

26. An article of claim 20 which is formed in the complete absence of post-molding extraction processes.

27. An article of claim 20, wherein said crosslinking and polymerizing are triggered by application of radiation for a period of less than about 5 minutes.

28. An article of claim 27, wherein said crosslinking and polymerizing are triggered by application of ultraviolet radiation for a period of less than about 1 minute.

29. An article of claim 20 wherein said polymer precursor is a crosslinkable polyvinyl alcohol or derivative thereof having a weight-average molecular weight of at least about 2000 comprising:

about 0.5% to about 80% of units of formula I, based on the number of hydroxy groups of the polyvinyl alcohol:

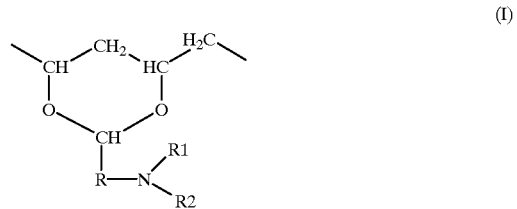

wherein:

R is lower alkylene having from 1 to 8 carbon atoms,

R1 is hydrogen or lower alkyl, and

R2 is an olefinically unsaturated, electron-attracting copolymerizable radical, having from 1 to 25 carbon atoms.

30. A method of claim 6, wherein the contact lens is a visibility tinted contact lens which is substantially uniformly tinted throughout the body of the lens.

* * * * *